United States Patent

[11] 3,595,402

[72] Inventor Charles W. Smaczny
Chicago, Ill.
[21] Appl. No. 816,715
[22] Filed Apr. 16, 1969
[45] Patented July 27, 1971
[73] Assignee The Pyle-National Company
Chicago, Ill.

[54] MODULAR TERMINAL BLOCK MOUNTING RACK
11 Claims, 9 Drawing Figs.

[52] U.S. Cl. .......... 211/26, 248/300
[51] Int. Cl. .......... A47f 7/00
[50] Field of Search .......... 211/26, 41, 13; 248/300

[56] References Cited

UNITED STATES PATENTS

| | | | |
|---|---|---|---|
| 2,812,149 | 11/1957 | Appleton | 248/300 X |
| 2,873,082 | 2/1959 | Gillespie | 248/300 |
| 2,900,074 | 8/1959 | Windman | 211/41 X |
| 2,916,159 | 12/1959 | O'Neill | 248/300 X |
| 3,160,280 | 12/1964 | Burch | 211/89 |
| 3,182,805 | 5/1965 | Foster | 211/26 |
| 3,216,580 | 11/1965 | Fricker | 211/41 |
| 3,303,394 | 2/1967 | Peter et al. | 211/41 X |

*Primary Examiner*—Nile C. Byers, Jr.
*Attorney*—Hill, Sherman, Meroni, Gross & Simpson

ABSTRACT: A modular mounting rack for mounting a plurality of electrical terminal blocks comprising a U-shaped channel member having a bottom wall and a pair of vertical sidewalls and a pair of mounting brackets disposed respectively adjacent and carried on said sidewalls, said mounting brackets being constructed and arranged to provide a plurality of modules each capable of receiving an individual terminal block in releasable snap-in relation. A handtool is provided to release the terminal blocks from the mounting rack.

INVENTOR
Charles W. Smaczny

BY Hill, Sherman, Meroni, Gross & Simpson ATTORNEYS

INVENTOR
Charles W. Smaczny

BY Hill, Sherman, Meroni, Gross & Simpson ATTORNEYS

MODULAR TERMINAL BLOCK MOUNTING RACK

BACKGROUND OF THE INVENTION

This invention relates generally to the field of electrical terminal block mounting apparatus and more particularly to a modular by constructed mounting rack for mounting a plurality of individual separately removable terminal blocks.

In general, terminal blocks are used to interconnect electrical conductors such as wires. In some electrical devices vast numbers of wires must be interconnected and many interconnecting terminal blocks are utilized. Groups of terminal blocks are often mounted on frames secured to stationary members and many electrical devices have substantial numbers of such frames or terminal block mounting racks secured thereto.

Certain problems have been encountered in the use of heretofore known terminal block mounting racks, however. Some such racks require that the terminal blocks, to be mounted thereon or removed therefrom, must be twisted or turned or otherwise nonrectilinearly. Since the wires are generally inserted in straight line mutually parallel relation into one side of the terminal block, any twisting or turning of the terminal block may well have the effect of pulling wires (or electrical contacts connected to the ends thereof) loose from the terminal block or, worse yet, causing actual damage to or electrical discontinuity in the wires.

Another problem frequently encountered also involves the mounting and removal of terminal blocks. Many mounting racks are constructed and arranged so that the group of terminal blocks must be mounted thereon seriatim and if it becomes necessary or desirable for one reason or another to remove a terminal block all those anterior thereof must first be removed. This often necessitates the removal of the various wires from each of the terminal blocks before removal of the terminal blocks themselves.

After the critical terminal block has been replaced all those posterior thereof must then also be replaced and all the wires thereto reconnected. The removal of more than one terminal block merely to remove a single terminal block gives rise to many disadvantages most of which are readily apparent to one skilled in the art.

Other deficiencies found singly or in combination in known terminal block mounting racks include reduced retention capability, that is, a reduced ability to maintain the terminal block on the mounting rack, inability to attenuate shock and vibration which may be disruptive or injurious to the terminal blocks, the conductors interconnected thereby or the electrical continuity resulting therefrom and inability to mount in a single rack terminal blocks performing various functions even though of suitable dimensional criteria.

A principal object of the present invention is to eliminate or substantially reduce all of these problems inherent in known mounting rack constructions.

SUMMARY OF THE INVENTION

A multiple terminal block mounting rack constructed in accordance with the principles of the present invention may be summarized as comprising a hollow rack body open along one side for receiving plural terminal blocks in the hollow thereof, means for individually receiving the terminal blocks in the rack body and for independently releasably locking the terminal blocks therein. Another facet of the invention involves the utilization of a hand-operated tool for individually releasing and removing the terminal blocks without any disruption whatsoever to any of the other terminal blocks or the electrical wiring connected thereto.

The invention features an elongated channel member having a pair of vertical legs and a bottom horizontal leg interconnecting the vertical legs. Disposed within and carried on the channel member adjacent the vertical legs are a pair of mounting brackets stamped from sheet metal in a manner whereby each provides a series of vertical flanges dividing the channel into a plurality of terminal block-receiving modules and a tine in each module to releasably lock a terminal block therein.

The brackets provide another pair of tines in each module against which the terminal block bottoms to cushion and dampen the effects of objectionable shock and vibration.

Many other features, advantages, and additional objects of the present invention will become manifest to those versed in the art upon making reference to the detailed description which follows and the accompanying sheets of drawings, in which a preferred structural embodiment incorporating the principles of the present invention is shown by way of illustrative example only.

DESCRIPTION OF THE PREFERRED EMBODIMENT

Although the principles of the present invention are of utility in providing a mounting rack for any electrical terminal block the invention finds particularly useful application in the mounting of terminal blocks having electrical contacts therein for receiving complemental contacts mounted on the ends of a multiplicity of electrical conductors such as wires.

Figure 1:
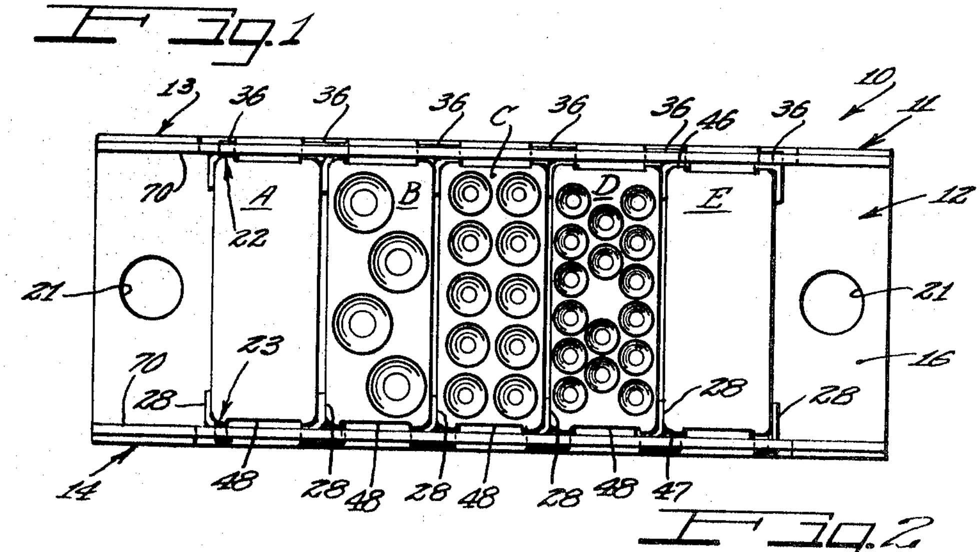
FIG. 1 is a top plan view of a multiple terminal block mounting rack constructed in accordance with the principles of the present invention and having mounted therein a plurality of terminal blocks.
Figure 2:
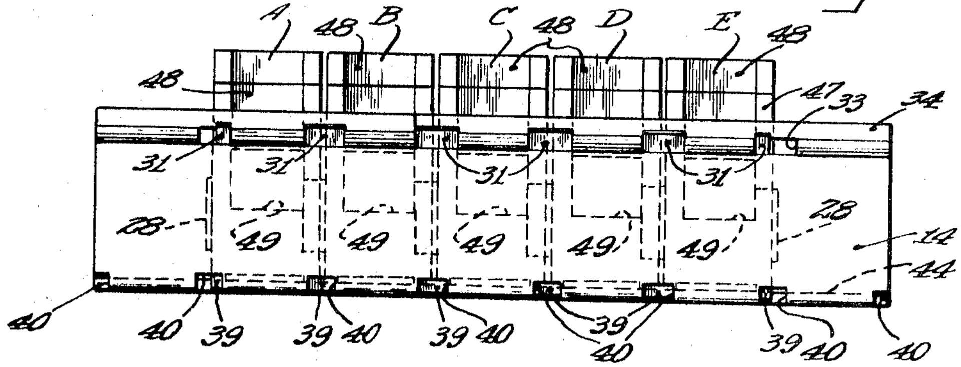
FIG. 2 is a side elevational view of the mounting rack arrangement shown in FIG. 1.
Figure 3:
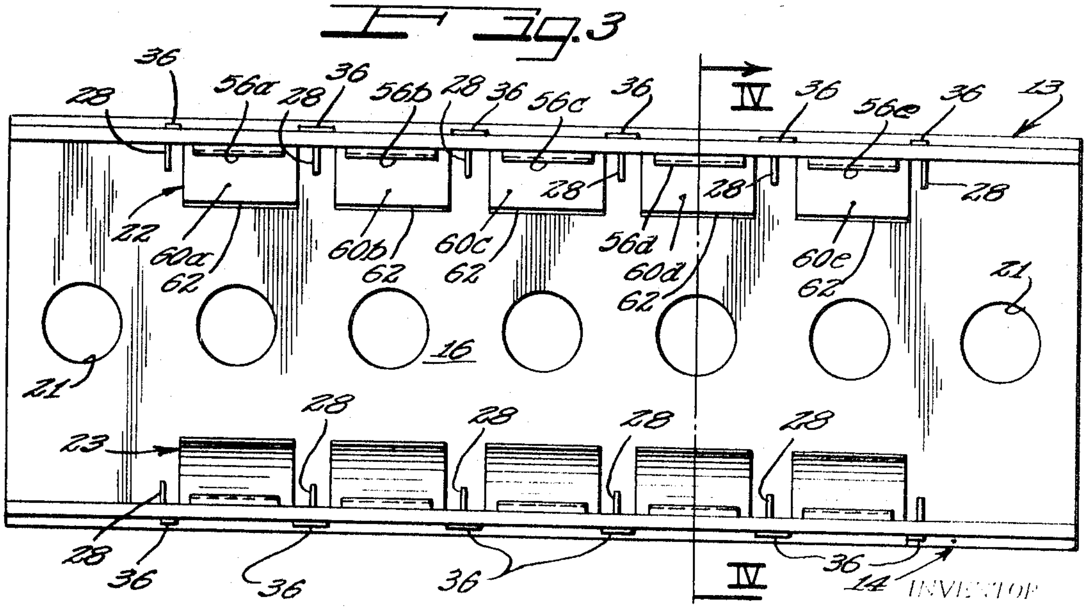
FIG. 3 is an enlarged top plan view of the mounting rack shown in FIG. 1 with the various terminal blocks removed therefrom.

Referring to the drawing a terminal block mounting rack constructed in accordance with the principles of the present invention is indicated generally at reference numeral 10. The illustrated embodiment is particularly adapted to mount a total of five terminal blocks, indicated respectively in FIGS. 1 and 2 at reference characters A, B, C, D, and E, although it will be apparent as this description proceeds that merely by varying the length of the mounting bracket 10 a greater or lesser number of terminal blocks may be accommodated.

The terminal block indicated at reference character B is constructed to receive the contact ends of four wires. The wires, when inserted in terminal block B, are electrically interconnected in accordance with a predetermined arrangement of the bus bar or bars in the terminal block B, are electrically interconnected in accordance with a predetermined arrangement of the bus bar or bars in the terminal block, as will be understood by those skilled in the art. Terminal block C is constructed to accommodate the contact ends of 10 wires whereas terminal block D will accommodate a total of 16 wires. The wire-receiving faces of terminal blocks A and E are shown blank to indicate that the size and number of wires which can be interconnected thereby may differ from those of terminal blocks B, C, D as requirements dictate.

It is further noted that terminal blocks A—E are disposed in the mounting bracket 10 such that the wire-receiving faces thereof are arranged on one side of the mounting bracket 10. Thus the wires which are interconnected by the terminal blocks A—E are arranged in parallel relation insofar as the inserted ends thereof are concerned.

Each of the terminal blocks A—E is physically separate and independent of the others. The several terminal blocks can be utilized to interconnect the electrical conductors of completely different electrical systems performing completely different functions. The only essential characteristic of the terminal blocks common to all is the general geometry thereof.

Figures 4, 5, 6, 7, 8, 9:
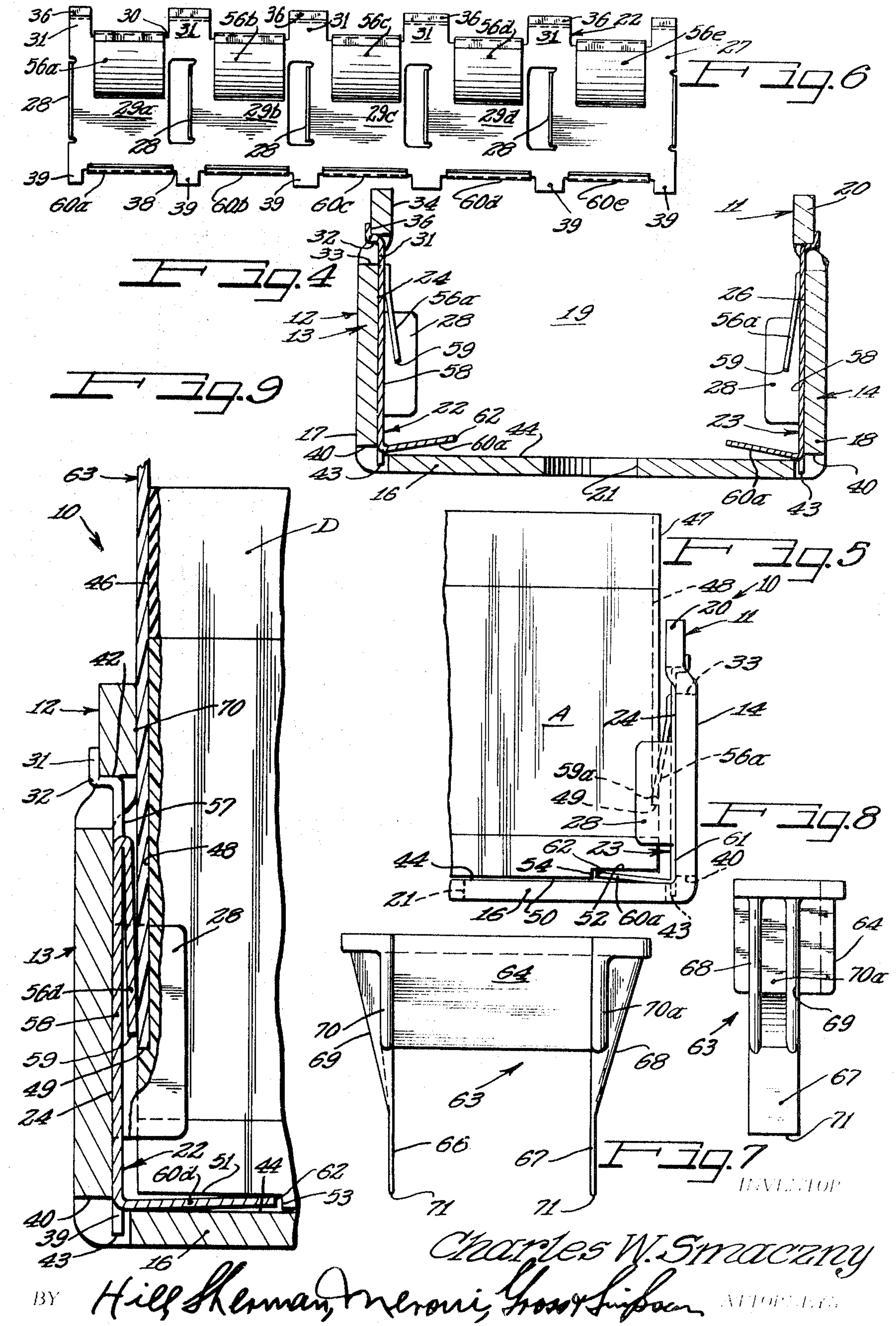
FIG. 4 is a cross-sectional view taken along lines IV–IV of FIG. 3.
FIG. 5 is an end elevational view similar to FIG. 4 but illustrating the disposition of certain parts when a terminal block is mounted in the mounting rack.
FIG. 6 is one of a pair of similar mounting brackets employed in the present invention.
FIG. 7 is a flat elevational view of a hand-operable tool useful in removing the terminal blocks from the mounting rack.
FIG. 8 is a side elevational view of the tool illustrated in FIG. 7.
FIG. 9 is an enlarged fragmental cross-sectional view of the mounting rack invention having a terminal block mounted therein and having the tool illustrated in FIGS. 7 and 8 inserted therein for removal of the terminal block.

The mounting bracket 10 may be more particularly characterized as comprising a frame or body 11 which includes a generally U-shaped channel member 12. As shown in FIG. 4 among other views, the channel member 12 comprises a pair of spaced parallel vertical legs 13 and 14 and a bottom horizontal wall 16 which interconnects bottom ends 17 and 18 of the vertical legs 13 and 14. The height and width of the interior of the channel member 12, indicated at reference numeral 19, substantially corresponds to the height and width of the terminal blocks suitable for mounting in the rack 10 although, as noted in FIG. 2, the upper ends of the terminal blocks A—E may project and preferably do project above upper ends 20 and 20*a* of the vertical legs 13 and 14.

The channel member 12 may be stamped and formed of flat sheet metal stock of sufficient gauge to preclude any substantial deformity and to provide a sufficiently strong and rugged mount for the terminal blocks. A series of apertures 21 are provided in the bottom leg 16 and the endmost apertures 21 which are not covered by terminal blocks may be advantageously used to receive fasteners such as screws or the like for securing the channel member 12 to a stationary member such as a wall or other support structure.

The mounting rack 10 also comprises a pair of mounting brackets 22 and 23 which are disposed respectively along inner surfaces 24 and 26 of the vertical legs 13 and 14. Because of the essentially similar construction of the mounting brackets 22 and 23 only one is described in detail herein.

Referring particularly to FIGS. 4—6, the mounting bracket 22 may be characterized as comprising a stamped, sheet-form member 27 which includes a series of vertical, transversely projecting flanges 28 which divide the sheet-form member 27 across the length thereof into a plurality of modules indicated respectively at reference characters 29*a*—29*e*. It is noted that the identification of the various modules corresponds to the identification of the terminal blocks A—E in the utilization of the letter references.

The mounting brackets 22 and 23 are carried on the vertical legs 13 and 14 in aligned relation with one another whereby the flanges 28 of one reside in coplanar relation with the flanges 28 of the other, thus establishing alignment between the modules 29*a*—29*e* of one with the other. The distance between the flanges 28, 28 of each of the modules along the longitudinal axis of its respective mounting bracket 22 and 23 corresponds quite closely to the width of the particular terminal block which is to be carried in that module.

Thus the flanges 28 serve to physically separate the individual terminal blocks A—E and ensure that each of the terminal blocks may be mounted or removed without causing any disruption whatsoever to adjacent terminal blocks.

The mounting brackets 22 and 23 are secured to their corresponding vertical legs 13 and 14 in the following manner. Extending or projecting upwardly above an upper edge 30 of the mounting bracket 22 are a plurality of tabs 31 arranged in vertical alignment with the transverse flanges 28. As illustrated in FIG. 4, each of the tabs 31 includes an out-turned portion 32 which extends through an aperture 33 formed in an inturned portion 34 of the upper end 20 of the vertical leg 13. An inner surface 36 of the out-turned portion 32 of the bracket 22 abuts in faying relation an outer surface 37 of the inturned portion 34 of the vertical leg 13.

Projecting downwardly from a lower edge 38 of the mounting bracket 22 are a corresponding plurality of tabs 39 also in substantial vertical alignment with the transverse flanges 28. The tabs 39 are arranged to fit into apertures 40 spaced along the longitudinal axis of the channel member 12 at the juncture of the vertical leg 13 and the bottom horizontal leg 16. Thus each of the upper tabs 31 is received in an aperture 33 formed in the vertical leg 13 and each of the lower tabs 39 is received in an aperture 40. In the assembled position of the bracket 22 an upper surface 41 of the out-turned portion 32 of each of the upper tabs 31 abuts a horizontal shoulder 42 comprising the upper wall of its corresponding aperture 33 formed in the vertical leg 13. In the abutting position of surfaces 41 and 42 a lower edge 43 of each of the lower tabs 39 extends below a top surface 44 of the horizontal bottom wall 16. Although the bracket 22 is bent slightly about its longitudinal axis in inserting the tabs 31 and 39 into their respective apertures 33 and 40 the inherent flexibility thereof causes the bracket 22 to once again assume its substantially planar configuration once the tabs have been inserted.

The mounting bracket 23 is in all material respects similar to bracket 22 and operates in conjunction with bracket 22 in releasably securing the terminal blocks A—E within the channel member 12.

Each of the terminal blocks A—E may be characterized as comprising a pair of end walls 46 and 47 which are recessed as at 48 to provide on each of the end walls a horizontal abutment or shoulder 49. A bottom wall 50 of each of the terminal blocks A—E is also recessed at the ends thereof as indicated at reference numerals 51 and 52 in FIGS. 9 and 5, respectively, to provide vertical abutments or shoulders 53 and 54.

The horizontal shoulders 49 are utilized in releasably locking their respective terminal blocks in place in their corresponding modules 29*a*—29*e*, and shoulders 53 and 54 are utilized in maintaining their respective terminal blocks in centered positions and in spaced relation with respect to the vertical walls 13 and 14 of the channel member 12.

To these ends the mounting brackets 22 and 23 both comprise a first series of tines indicated at reference numerals 56*a*—56*e* which project downwardly from upper portions 56 of their corresponding mounting brackets 22 and 23 and also inwardly of the interior 19 of the channel member 12 or outwardly away from substantially planar major portions 58 thereof. Each of the tines 56*a*—56*e* terminates at a horizontally extending outer edge 59 which serves as an abutment or shoulder surface.

In forming the brackets 22 and 23 the tines 56*a*—56*e* are reverse folded or doubled or bent back over the major planar portion 58 to provide a predetermined included angle therebetween. In the free or unstressed state of the tines 56*a*—56*e* the distance between the distal edges 59 of opposed tines on the facing brackets 22 and 23 is greater than the distance between the sidewalls 46 and 47 of the terminal blocks A—E.

Also formed on the mounting brackets 232 and 23 are a second series of tines indicated at reference numerals 60*a*—60*e*. This second series of tines is bent inwardly and slightly upwardly with respect to a lower portion 61 of their corresponding mounting brackets 22 and 23 and each terminates at a vertical end wall 62 as shown, for example, in FIG. 4. In forming the mounting brackets 22 and 23 the tines 60*a*—60*e* are bent at an angle with respect to the major planar portion 58 such that in the free or unstressed state thereof the distal ends 62 are disposed upwardly from the top surface 44 of the channel member bottom wall 16 a distance greater than that permitted by the geometry of the terminal blocks A—E in the assembled positions thereof within the channel member 12.

Thus, in the free or unstressed states thereof the first and second series of tines 56*a*—56*e* and 60*a*—60*e* assume the positions thereof shown in FIG. 4. As the terminal blocks A—E are inserted into their respective modules the sidewalls 46 and 47 are guided into position between their respective transverse flanges 28, 28 and are then pushed rectilinearly toward the bottom wall 16 of the channel member 12.

As the sidewalls 46 and 47 engage their corresponding tines 56*a*, 56*a* the tines are pushed or bent from the free or unstressed positions thereof as indicated in FIG. 4 to a stressed position as indicated in FIG. 5.

Further downward movement of the terminal blocks A—E effectively maintains the distal ends 59 of the tines 56*a* in the stressed positions thereof until they move adjacent the shoulder 49 formed on the sidewalls 46 and 47 of the terminal blocks, whereupon the tines 59 spring inwardly against the recess walls 48. The distal ends 59*a* then reside in the path of movement of shoulders 49, preventing removal of the terminal blocks A—E out of their respective modules 29*a*—29*e*.

As the terminal blocks A—E are inserted into locking engagement with the tines 29*a*—29*e* the bottom recessed walls 52 thereof engage the distal ends 62 of the second series of tines 60*a*—60*e* to bend the tines downwardly from the free state positions thereof as indicated in FIG. 4 to the stressed positions thereof as shown in FIG. 5. Thus in the assembled positions of the terminal blocks A—E the tines 60*a*—60*e* are placed under slight tension, maintaining the bottom walls 50 of the terminal blocks A—E in spaced relation to the upper surface 44 of the channel member bottom wall 16.

As a result of the tensioned state of tines 56*a*—56*e* and 60*a*—60*e* the terminal blocks are cushioned against undue vibration or shock transmitted by the channel member 12.

To remove the terminal blocks A—E from their respective modules 29*a*—29*e* it is necessary to spread the tines 56*a* out of the path of movement of the shoulder 49 formed on the sidewalls 46 and 47 of the terminal blocks. For that purpose the present invention further involves the utilization of a handtool indicated generally in FIGS. 7—9 at reference numeral 63. The tool 63 comprises a main body portion 64 from which depend a pair of thin sheet-form fingers 66 and 67. The body portion 64 is of finger-gripping size so that it may be grasped between the thumb and forefinger. A pair of ribs 68 and 69 project from opposite sides 70 and 71 of the body portion 64 to add rigidity to the fingers 66 and 67.

To remove a terminal block the tool 63 is held above the channel member 12 and the fingers 66 and 67, which are spaced a distance corresponding to the distance between the recessed walls 48, 48 of each of the terminal blocks A—E, are guided down into the recesses 48. The cross-sectional thickness of fingers 66 and 67 is sufficiently thin to enable the fingers to pass between the recess walls 48 and an inner wall 70 of the channel member sidewalls 13 and 14.

As lower edges 71 of the fingers 66 and 67 engage a corresponding pair of tines 66*a*—66*e* they spread the tines and ultimately abut the corresponding shoulders 49 of the recesses 48. The particular terminal block thus straddled by the tool 63 can then be rectilinearly withdrawn from its respective module 29*a*—29*e* without abutment of the lower edges 59 of the tines 56*a*—56*e*.

Thus in addition to individually mounting a plurality of separate terminal blocks the mounting rack 10 ensures only rectilinear movement of the terminal blocks A—E during both insertion thereinto and withdrawal therefrom. Furthermore the mounting brackets 22 and 23 provide an attenuating effect on vibration and shock forces which might otherwise be transmitted to the terminal blocks and the wire conductors interconnected thereby from the channel member 12.

Although minor modifications might be suggested by those versed in the art it should be understood that I wish to embody within the scope of the patent hereon all such modifications as reasonably come within the scope of my contribution to the art.

I claim:

1. A modular rack for mounting a plurality of electrical terminal blocks of predetermined geometry each having a locking surface thereon and comprising
  an elongated open-sided U-shaped channel member having a pair of vertical legs and a horizontal bottom leg interconnecting the vertical legs,
    means on said channel member extending transversely of said legs for dividing the interior thereof into a plurality of modules each sized to receive in inserted relation through the open side thereof a correspondingly sized terminal block, and
    spring action means on said channel member in each of said modules for engaging the locking surface of its corresponding terminal block and for automatically individually releasably locking the terminal block in place when it is inserted in its module,
    said spring action means comprising means for biasing its corresponding terminal block away from and out of abutting engagement with said vertical legs.

2. A modular rack for mounting a plurality of electrical terminal blocks of predetermined geometry each having a locking surface thereon comprising
  an elongated open-sided U-shaped channel member having a pair of vertical legs and a horizontal bottom leg interconnecting the vertical legs,
  means on said channel member extending transversely of said legs for dividing the interior thereof into a plurality of modules each sized to receive in inserted relation through the open side thereof a correspondingly sized terminal block, and
  spring action means on said channel member in each of said modules for engaging the locking surface of its corresponding terminal block and for automatically individually releasably locking the terminal block in place when it is inserted in its module,
    said channel member dividing means and said terminal block locking means together comprising portions of a pair of stamped sheet-form members mounted respectively on said vertical legs and extending along the inner surfaces thereof.

3. A multiple terminal block mounting rack comprising a rack body including a pair of elongated spaced parallel wall members disposed in aligned side-by-side relation and interconnected in fixed assembly,
  a pair of elongated mounting brackets carried respectively on said wall members adjacent the mutually facing surfaces thereof and arranged in longitudinally aligned relation with one another,
  each of said mounting brackets comprising
    a flat sheet-form member,
    a plurality of flanges on said sheet-form member extending transversely thereof and projecting transversely therefrom for dividing said sheet-form member into a plurality of terminal block-receiving modules arranged seriatim along the length of said sheet-form member,
    means on said sheet-form member within each said module forming a tine for engaging in releasable locking relation a cooperating surface formed on a corresponding terminal block for maintaining the terminal block in locked assembly in said mounting racket upon insertion thereof into a pair of aligned modules formed respectively on said mounting brackets,
    means on said sheet-form member forming a first series of longitudinally spaced tabs projecting upwardly above said tines, and means forming a first series of apertures in each said wall members spaced in accordance with the spacing of said tabs for receiving said tabs in interlocking relation.

4. The invention as defined in claim 3 and including
  means on each said sheet-form member forming a second series of longitudinally spaced tabs projecting downwardly below said tines, and
  means forming in said rack body apertures corresponding to said second series of tabs for receiving same in interlocking relation.

5. A multiple terminal block mounting rack comprising
  a rack body including a pair of elongated spaced parallel wall members disposed in aligned side-by-side relation and interconnected in fixed assembly, and
  a pair of elongated mounting brackets carried respectively on said wall members adjacent the mutually facing surfaces thereof and arranged in longitudinally aligned relation with one another,
  each of said mounting brackets comprising
    a flat sheet-form member,
    a plurality of flanges formed on said sheet-form member extending transversely thereof and projecting transversely therefrom for dividing said sheet-form member into a plurality of terminal block-receiving modules arranged seriatim along the length of said sheet-form member, and means on said sheet-form member within each said module forming a tine for engaging in releasable locking relation a cooperating surface formed on a corresponding terminal block for maintaining the terminal block in locked assembly in said mounting rack upon insertion thereof into a pair of aligned modules formed respectively on said mounting brackets, said rack body comprising a bottom wall member interconnecting said vertical wall members each having a slightly inturned portion extending longitudinally adjacent the upper edge thereof, said vertical wall members further each having means forming a first series of longitudinally spaced apertures in said inturned portion thereof, said vertical wall members and said bottom wall member having means forming at the junctures thereof a second series of apertures aligned vertically with said first series, and said sheet-form members each having thereon means forming a first and second series of tabs projecting respectively upwardly above and downwardly below their corresponding tines for insertion into said apertures for locking said sheet-form members in place on said rack body.

6. The invention as defined in claim 5 wherein said tabs in said first series each comprise an out-turned portion corresponding to the inturned portion of its respective vertical wall member which projects through its corresponding aperture to an opposite side of its corresponding vertical wall member.

7. A multiple terminal block mounting rack comprising a rack body including a pair of elongated spaced parallel wall members disposed in aligned side-by-side relation and interconnected in fixed assembly, and a pair of elongated mounting brackets carried respectively on said wall members adjacent the mutually facing surfaces thereof and arranged in longitudinally aligned relation with one another, each of said mounting brackets comprising a flat sheet-form member, a plurality of flanges formed on said sheet-form member extending transversely thereof and projecting transversely therefrom for dividing said sheet-form member into a plurality of terminal block-receiving modules arranged seriatim along the length of said sheet-form member, and means on said sheet-form member within each said module forming a tine for engaging in releasable locking relation a cooperating surface formed on a corresponding terminal block for maintaining the terminal block in locked assembly in said mounting rack upon insertion thereof into a pair of aligned modules formed respectively on said mounting brackets.

8. The invention as defined in claim 7 wherein said tines project downwardly and outwardly at an angle from upper portions of said sheet-form members.

9. The invention as defined in claim 7 wherein each of said sheet-form members further comprises a second tine in each said module projecting outwardly and slightly upwardly from a lower portion of said sheet-form member for providing a flexible spring cushion for the bottom of the terminal block.

10. A mounting bracket for use with a similar bracket for securing a terminal block to a terminal block mounting rack comprising a substantially rectangularly shaped elongated sheet-form member stamped to provide first and second series of vertically aligned horizontally spaced tabs projecting respectively upwardly and downwardly from said sheet-form member, a plurality of cutouts forming vertically extending transversely projecting flanges in vertical alignment with said tabs, a first series of tines disposed horizontally and vertically between said tabs and bendable back over said sheet-form member to project downwardly from a top edge of said sheet-form member with a minor included angle therebetween, and a second series of tines in vertical alignment with said first series of tines and projecting outwardly and slightly upwardly from a bottom edge of said sheet-form member with a minor included angle therebetween.

11. The invention as defined in claim 10 wherein each of said first series of tabs comprises a portion bent outwardly with respect to said first series of tines.